US006755275B2

(12) United States Patent
Okanda

(10) Patent No.: US 6,755,275 B2
(45) Date of Patent: Jun. 29, 2004

(54) CONTROLLER POSITIONING STRUCTURE FOR VEHICLE

(75) Inventor: Toru Okanda, Hachiouji (JP)

(73) Assignee: Nissan Motor Co., Ltd., Kanagawa (JP)

(*) Notice: Subject to any disclaimer, the term of this patent is extended or adjusted under 35 U.S.C. 154(b) by 153 days.

(21) Appl. No.: 10/078,393

(22) Filed: Feb. 21, 2002

(65) Prior Publication Data

US 2002/0139602 A1 Oct. 3, 2002

(30) Foreign Application Priority Data

Mar. 30, 2001 (JP) ........................................ 2001-102321

(51) Int. Cl.[7] .............................................. A62D 1/02
(52) U.S. Cl. ...................................... 180/329; 180/331
(58) Field of Search ................................ 180/326, 335, 180/336, 329, 331; 296/24.1

(56) References Cited

U.S. PATENT DOCUMENTS

| 4,057,122 A | * | 11/1977 | Brownell et al. ............ 180/329 |
| 4,355,819 A | * | 10/1982 | Frisbee ........................ 280/752 |
| 4,478,308 A | * | 10/1984 | Klaassen ..................... 180/326 |
| 4,877,287 A | * | 10/1989 | Escaravage ............. 297/411.36 |
| 5,042,314 A | * | 8/1991 | Rytter et al. .................. 74/335 |
| 5,086,870 A | * | 2/1992 | Bolduc ........................ 180/333 |
| 5,409,079 A | * | 4/1995 | Strong et al. ................ 180/326 |
| 5,409,080 A | * | 4/1995 | Templeton et al. ......... 180/326 |
| 5,617,929 A |   | 4/1997 | Richardson et al. |
| 6,352,133 B1 | * | 3/2002 | Ojima ........................ 180/326 |

FOREIGN PATENT DOCUMENTS

| DE | 19611895 C1 | 7/1997 |
| DE | 19746438 A1 | 4/1999 |
| EP | 0841211 A2 | 5/1998 |
| JP | 6070405 A | 3/1994 |
| JP | 9-11799 | * 1/1997 |
| JP | 9076805 A | 3/1997 |
| JP | 10252100 A | 9/1998 |
| JP | 2000066753 A | 3/2000 |
| JP | 2000112551 A | 4/2000 |

* cited by examiner

Primary Examiner—Paul N. Dickson
Assistant Examiner—Toan C To
(74) Attorney, Agent, or Firm—Shinjyu Global IP Counselors, LLP

(57) ABSTRACT

The present invention provides a controller positioning structure for a vehicle in which the controller such as a shift lever can be positioned at a front to rear position that is optimum for the driver. Since the shift lever or controller is movable in the front to rear direction and stoppable at any desired position, the driver can adjust the front to rear position of the shift lever at the optimum position. Therefore, operation of the shift lever is made easy.

13 Claims, 7 Drawing Sheets

CONTROLLER POSITIONING STRUCTURE FOR VEHICLE

BACKGROUND OF THE INVENTION

1. Field of the Invention

The present invention relates to an arrangement of a controller such as a shifting controller that is operated from a driver's seat of a vehicle. More specifically, the present invention relates to a controller that can be selectively positioned within a predetermined range in a front to rear direction of the vehicle that is optimum for the driver.

2. Background Information

Typically, a shift lever that outputs a transmission signal to the transmission is located on one side of the driver's seat in an automobile. Thus, the shift lever is provided as a "controller" for the transmission. The shift lever often electronically operates the transmission. Specifically, by tilting the shift lever in a forward direction or in a rearward direction, an electromechanical signal is sent to the transmission, such that the driver can select a desired transmission gear. This type of arrangement is disclosed in Japanese Laid-Open Patent Application No. 6-70405. A shift lever of this type is typically located in a center console or an armrest, which is provided on one side of the driver's seat. The front to rear position of the shift lever is fixed to the vehicle.

In view of the above, there exists a need for an improved controller structure. This invention addresses this need in the art as well as other needs, which will become apparent to those skilled in the art from this disclosure.

SUMMARY OF THE INVENTION

It has been discovered that in a conventional shift lever arrangement, the driver's seat moves in a front to rear direction to conform to the driver's size and driving posture. However, the front to rear position of the shift lever is fixed. As a result, when a small driver moves the driver's seat to the most forward position, the shift lever may be positioned too far to the rear of the driver's seat for the small driver to use comfortably. Similarly, when a large driver moves the driver's seat to the most rearward position, the shift lever may be positioned too forward of the driver's seat for the large driver to use comfortably. Accordingly, the front to rear position of the shift lever may not be the optimum one for the driver.

This invention has been conceived in view of the shortcomings of the conventional technology described above. Thus, one object of the present invention is to provide a controller positioning structure for a vehicle in which the controller, such as a shift lever, can be moved to an optimum front to rear position for a particular driver.

The foregoing object can be attained by providing a controller positioning structure for a vehicle, comprising a controller and a controller moving mechanism. The controller is configured to output a vehicle control signal. The controller moving mechanism is configured to be mounted adjacent a lateral side of a driver's seat of the vehicle. The controller moving is configured to selectively move in a front to rear direction of the vehicle and to selectively stop at any desired position within a front to rear movable range. The controller moving mechanism is operatively coupled to the controller such that the controller moves in the front to rear direction of the vehicle.

These and other objects, features, aspects and advantages of the present invention will become apparent to those skilled in the art from the following detailed description, which, taken in conjunction with the annexed drawings, disclose a preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
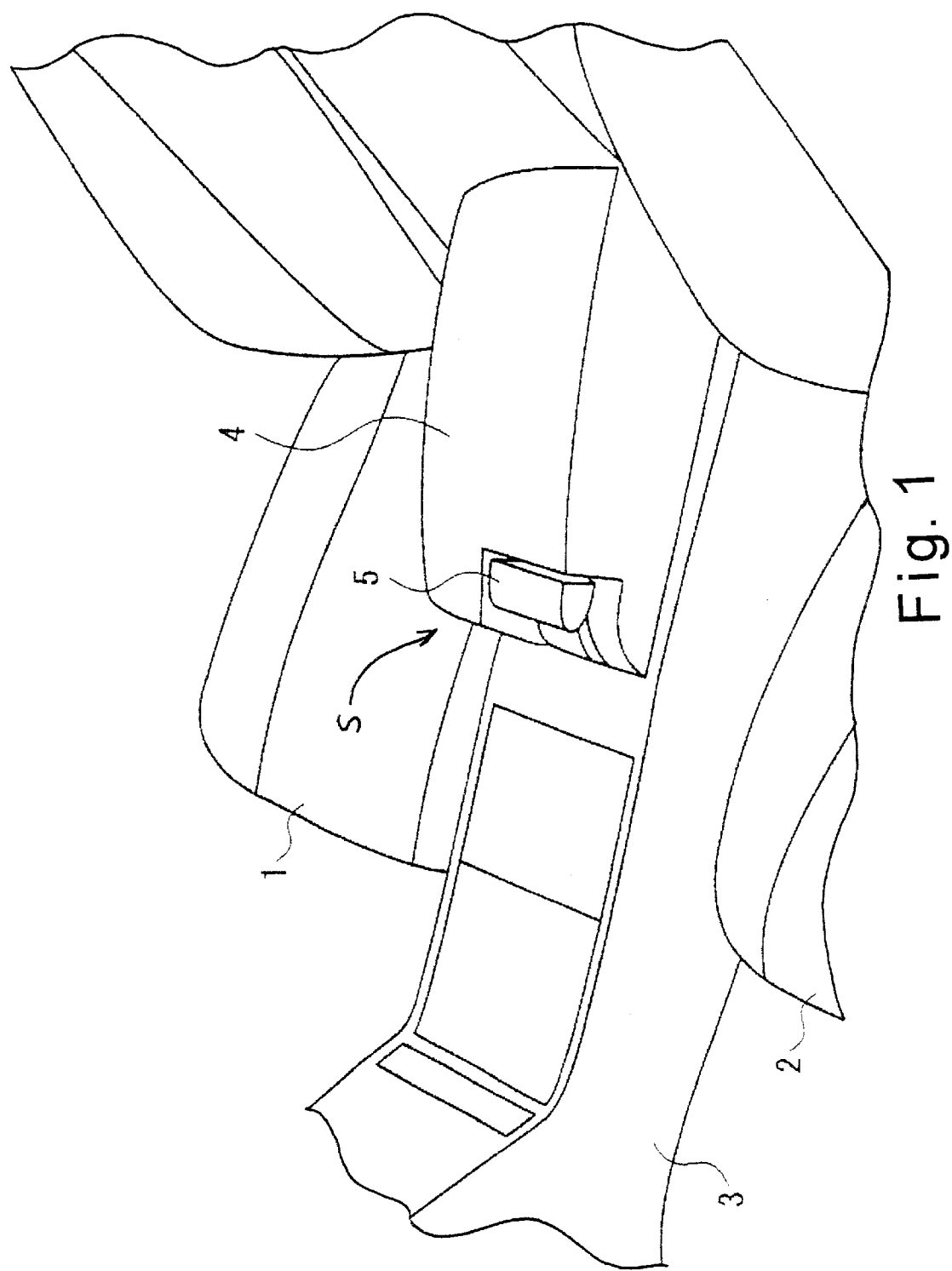
FIG. 1 is a perspective view of an interior portion of a vehicle with a controller positioning structure having a shift lever located in an armrest so as to be movable in a front to rear direction of the vehicle in accordance with a first embodiment of the present invention.
Figure 2:
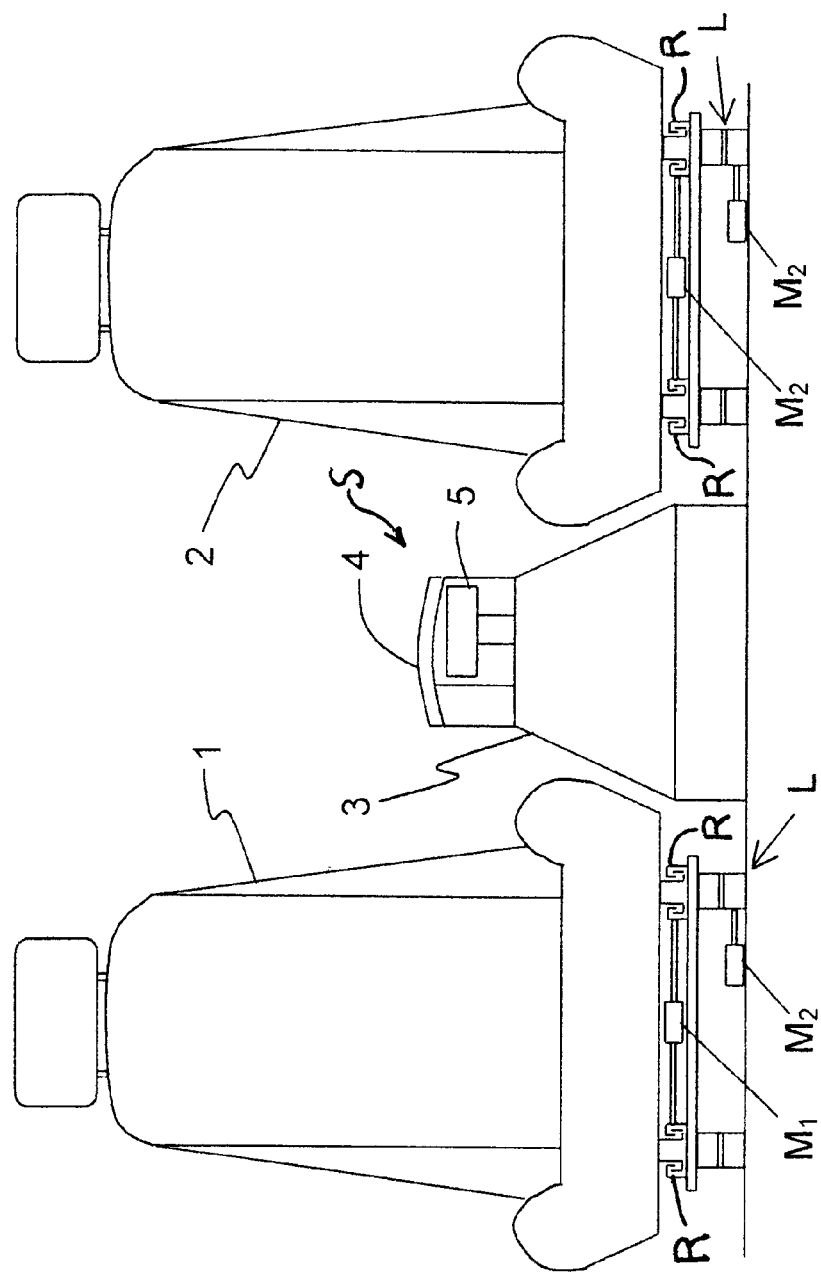
FIG. 2 is a front schematic elevational view of the interior portion of the vehicle illustrated in FIG. 1 with the controller positioning structure of the first embodiment of the present invention mounted therein.
Figure 4:
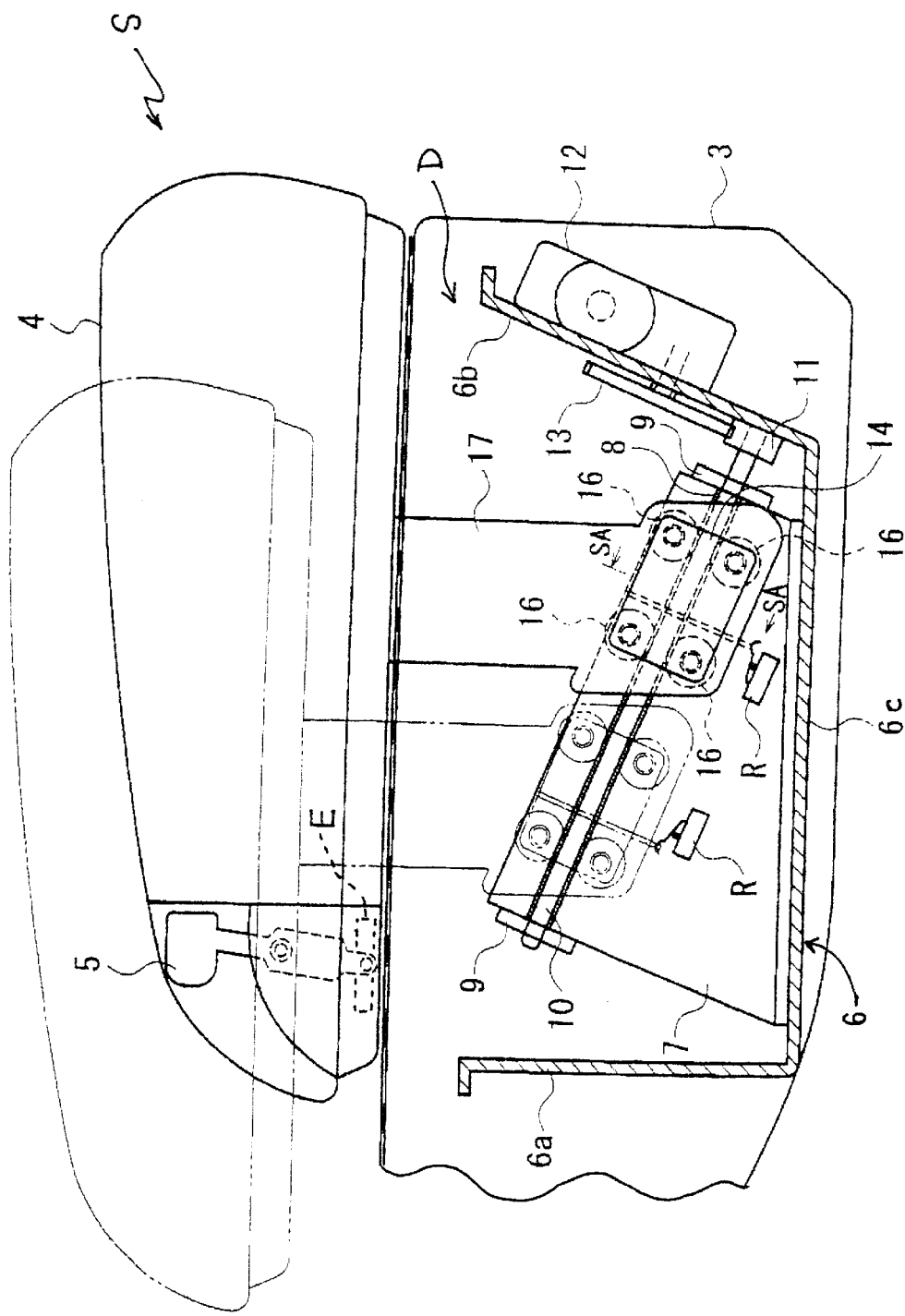
FIG. 4 is a schematic cross-sectional view of the armrest and the controller moving mechanism of the controller positioning structure in accordance with the first embodiment of the present invention.

Referring initially to FIGS. 1, 2 and 4, an interior portion of a vehicle is illustrated with a controller positioning structure S in accordance with a first embodiment of the present invention. The interior portion of the vehicle is equipped with a driver's seat 1 and a navigator's seat 2 with a center console 3 located between the front vehicle seats 1 and 2. An armrest 4 is movable mounted above the center console 3, which is disposed between the driver's seat 1 and the navigator's seat 2. A hand operated controller 5 is located at the front end portion of the armrest 4.

Figure 3:
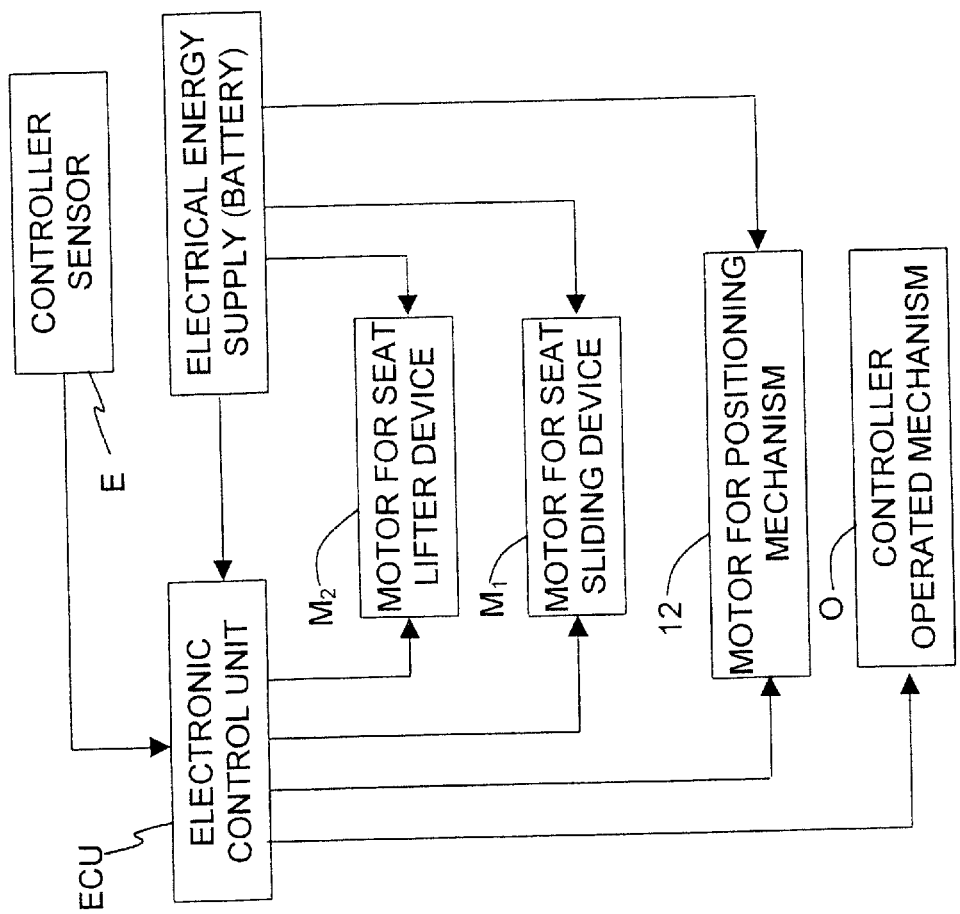
FIG. 3 is a block diagram of the main electrical components of the controller positioning structure illustrated in FIGS. 1 and 2 in accordance with a first embodiment of the present invention.
Figure 5:
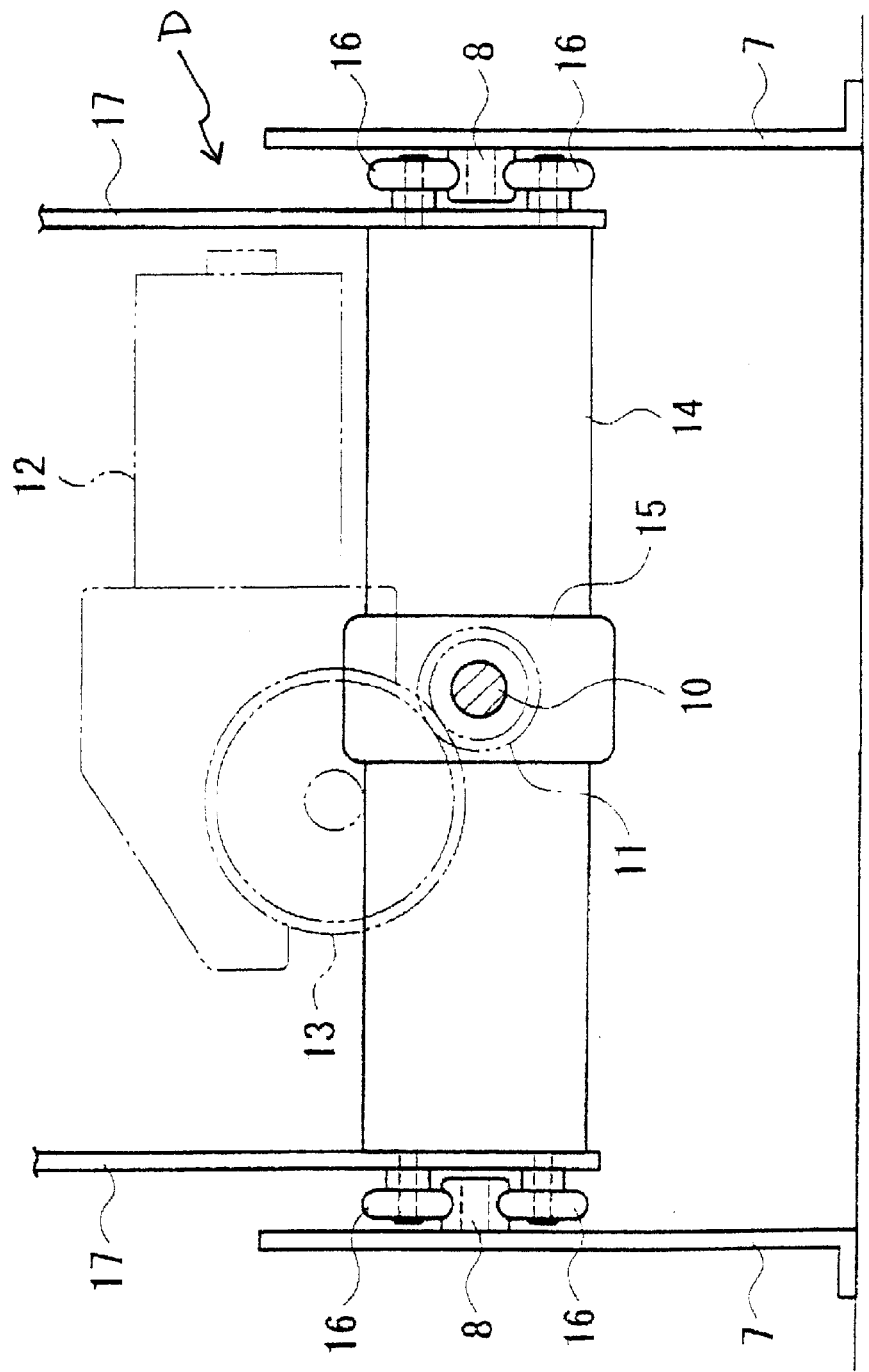
FIG. 5 is a schematic cross-sectional view of the controller positioning structure as viewed along section line 5—5 of FIG. 4.
Figure 6:
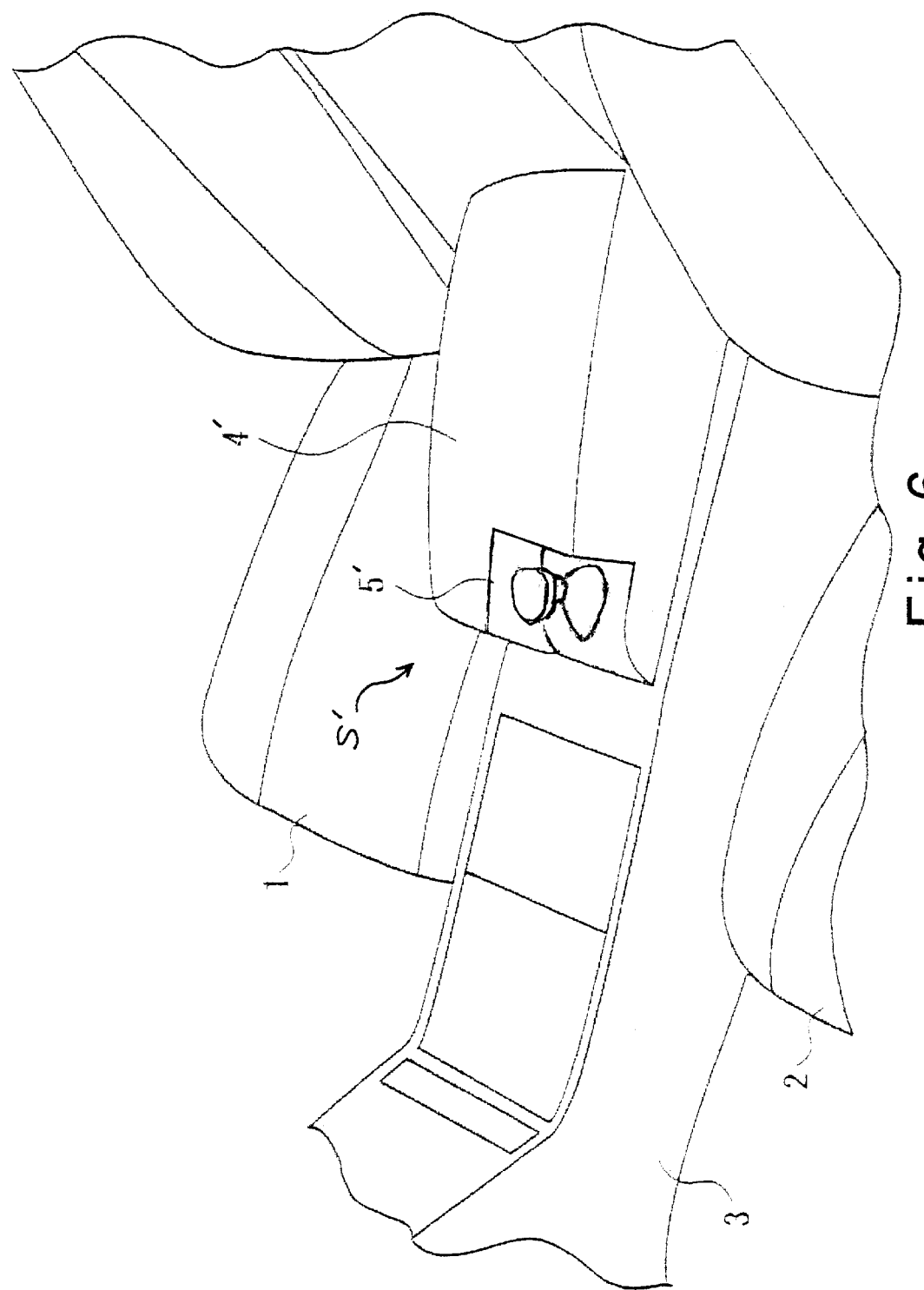
FIG. 6 is a perspective view of an interior portion of a vehicle with a controller positioning structure having a joystick located in an armrest so as to be movable in a front to rear direction of the vehicle in accordance with a second embodiment of the present invention.
Figure 7:
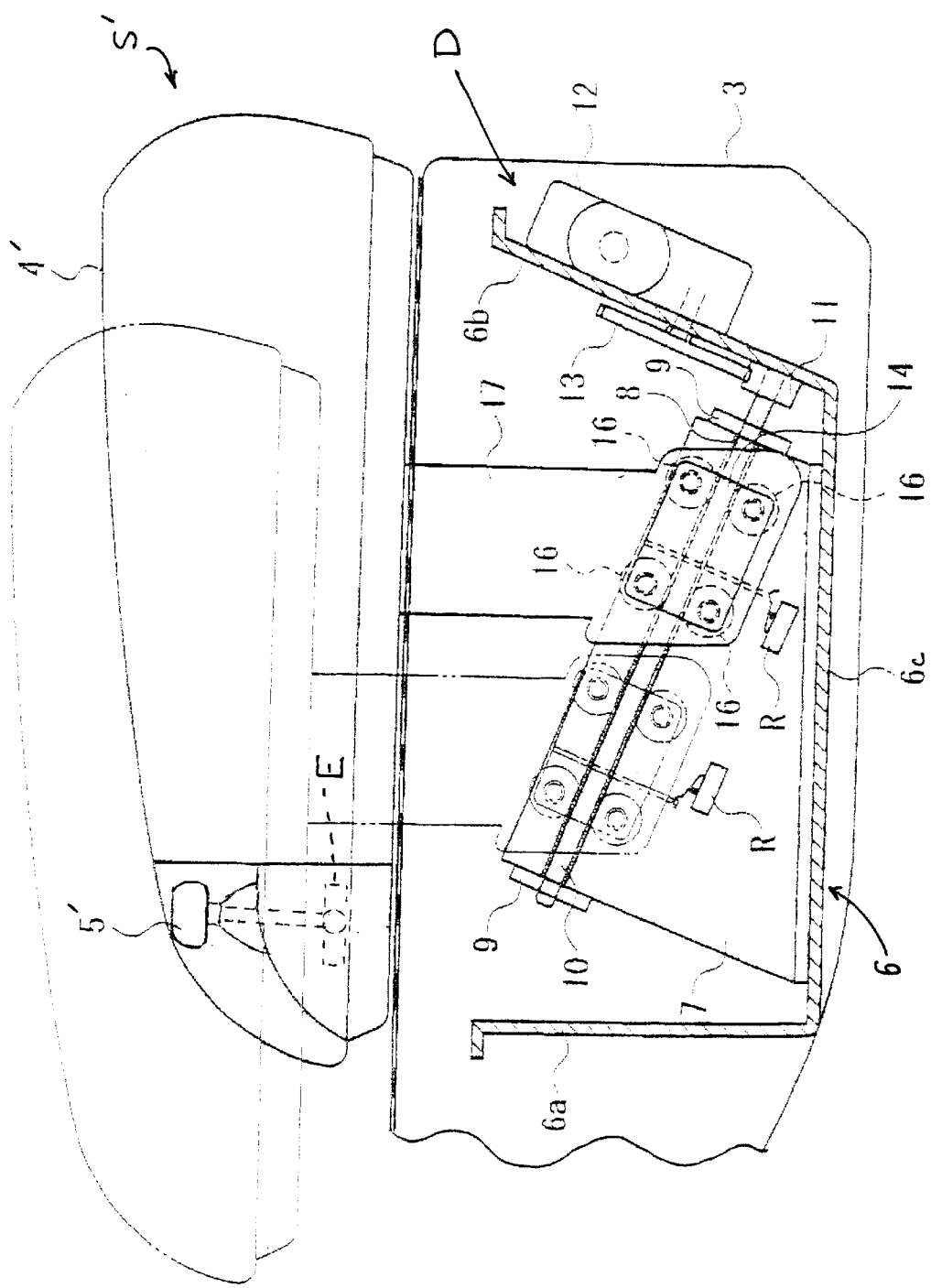
FIG. 7 is a schematic cross-sectional view of the armrest and the controller moving mechanism of the controller positioning structure in accordance with the second embodiment of the present invention.

As seen in FIG. 3, the controller 5 is preferably an electronic pivoting lever (see FIGS. 1–5) or an electronic joy stick (see FIGS. 6 and 7). The controller 5 is operatively coupled to a control unit ECU, which in turn operates a controller operated mechanism O of the vehicle. The controller operated mechanism O is at least one of a transmission mechanism, an acceleration mechanism, and a brake mechanism. In particular, movement of the controller 5 is detected by an electronic sensing device or controller sensor E that sends a vehicle control signal to the electronic control unit ECU, which in turn operates the controller operated mechanism O. Controller operated mechanisms, such as transmission mechanisms, acceleration mechanisms and brake mechanisms, are conventional components that are well known in the art. Since transmission mechanisms, acceleration mechanisms and brake mechanisms are well known in the art, these controller operated mechanisms will not be discussed or illustrated in detail herein.

In Japan, vehicles have the driver's seat 1 positioned in a front right side of the passenger compartment with the transmission shift lever (controller 5) being typically positioned between the front vehicle seats 1 and 2 for operation with the driver's left hand. However, passenger vehicles in many other countries, such as the United States, position the driver on the front right side of the passenger compartment. Thus, in countries such as the United States, the vehicles have the driver's seat positioned in a front left side of the passenger compartment with the transmission shift lever (controller 5) being positioned between the front vehicle seats for operation with the driver's right hand. It will be apparent to those skilled in the art that the present invention can be readily adapted to vehicles with the transmission shift lever (controller 5) located on either the right or left side of the driver's seat.

As seen in FIGS. 4 and 5, the controller 5 is movable mounted to the armrest 4 which in turn is movable mounted to the center console 3 by a controller moving or drive mechanism D. Thus, the armrest 4, the controller 5 and the controller moving mechanism D form the basic components of a controller positioning structure S that is configured to be fixedly mounted to the center console 3 or other structure located between the driver's seat 1 and the navigator's seat 2. The controller moving mechanism D is designed such that the controller 5, such as a shift lever, can be positioned at a front to rear position that is optimum for the driver. Since the controller 5 is movable in the front to rear direction and stoppable at any desired position, the driver can adjust the front to rear position of the controller 5 at the optimum position. Therefore, operation of the controller 5 is made easy. In the illustrated embodiment, the movements of the controller moving mechanism D is controlled by the electronic control unit ECU, as explained below.

The driver's seat 1 is preferably a powered seat that is movably supported by a pair of slide rails R in a conventional manner. The driver's seat 1 is preferably movable in the front to rear direction by a driving force of an electrically powered motor Ml disposed in between the slide rails R. Moreover, a lifter device L is preferably located beneath the seat cushion of the driver's seat 1 for adjusting the vertical position of the seat cushion of the driver's seat 1. In other words, the lifter device L can lift up the upper surface (seating surface) of the seat cushion. The lifter device L is preferably movable up and down in the vertical direction by a driving force of an electrically powered motor $M_2$ disposed in between the slide rails R. Powered seats with lifter devices are conventional components that are well known in the art. Since powered seats with lifter devices are well known in the art, the front to rear drive mechanism for the driver's seat 1 and the lifter device L for the driver's seat 1 will not be discussed or illustrated in detail herein.

Thus, the controller 5 moves such that the controller 5 is positioned at a higher position when the controller 5 is at a forward position than it is when the controller 5 is at a rearward position. Therefore, when a smaller driver keeps his position high at the most forward seating position by placing a cushion on the driver's seat 1 or by lifting the seating surface of the driver's seat 1 with the lifter device L in order to keep the driving eyesight high, the controller 5 is also lifted to follow the driver's position. Therefore, not only the front to rear position of the controller 5 is adjusted to the optimum position, but the vertical position of the controller 5 is also adjusted to almost an optimum position. Accordingly, the driver can operate the controller 5 more easily.

In the illustrated embodiment, the movements of the driver's seat 1 is coordinated with the movements of the armrest 4 and the controller 5 by the electronic control unit ECU. In other words, when the driver moves the driver's seat 1, the electronic control unit ECU automatically moves the armrest 4 and the controller 5. The electronic control unit ECU is preferably programmed so that the movement of the armrest 4 is proportioned to the movement of the driver's seat 1 in the default setting. Of course, the vehicle is also provided with one or more operating members or switches for controlling the controller moving mechanism D to select the optimum position of the controller 5 independently of the movement of the driver's seat 1.

Alternatively, the driver's seat 1 is a movable in the front to rear direction by a manually moving a lever to selectively release and lock the driver's seat 1 on the slide rails R in a conventional manner. Thus, the driver's seat 1 is movable in the front to rear direction and stoppable at any desired position so that the driver can adjust the front to rear position of the driver's seat 1 at the optimum position. When the present invention is used with a manually operated driver's seat, the vehicle is provided with one or more operating members (e.g., buttons, levers, etc.) for controlling the controller moving mechanism D to select the optimum position of the controller 5.

The driver's seat 1 is lockable at any desired position within a front to rear movable range between a most forward position of the driver's seat 1 and a most rearward position of the driver's seat 1. The most forward position of the driver's seat 1 for a particular vehicle is preferably determined by assuming a driver of a smallest physique (dummy JF25) is sitting in the driver's seat 1. The most rearward position of the driver's seat 1 for a particular vehicle is determined by assuming a driver of a largest physique (dummy AM99) is sitting in the driver's seat 1.

Since the armrest 4 moves in the front to rear direction in sync with the front to rear movement of the driver's seat 1, the front to rear position of the armrest 4 and the controller 5 can be automatically adjusted to the optimum one by simply moving the driver's seat 1 in the front to rear direction.

The driver's seat 1, the armrest 4 and the controller 5 all move in sync such that a relative position of the driver's seat 1 within a front to rear movable range of the driver's seat 1 is substantially the same as a relative position of the armrest 4 and controller 5 within a front to rear movable range of the armrest 4 and the controller 5. Therefore, even when the front to rear movable range of the armrest 4 and the controller 5 is different from the front to rear movable range of the drive's seat 1, the front to rear position of the armrest 4 and the controller 5 can be adjusted to a more optimum one.

As mentioned above, the armrest 4 is movable in the front to rear direction of the vehicle by the controller moving mechanism D. The controller 5 is mounted at the front end portion of the armrest 4. Thus, the movement of the armrest 4 in the front to rear direction of the vehicle by the controller moving mechanism D also results in the controller 5 moving with the armrest 4.

In the illustrated embodiment, the controller 5 is pivotally mounted at the front end portion of the armrest 4. The controller 5, which is preferably a transmission shift lever, cooperates with the electronic sensing device E that is electrically coupled to the electronic control unit ECU. By tilting the controller 5 in either a forward direction or a rearward direction, an electrical transmission signal (vehicle control signal) that corresponds to the tilting angle of the controller 5 is outputted from the sensing device E to the electronic control unit ECU to control the vehicle's transmission. Electronic controller such as electronic shift levers are conventional components that are well known in the art. Since electronic controllers are well known in the art, the details of the controller 5 will not be discussed or illustrated in detail herein.

Since this operation of the controller 5 only involves transmission of electrical signals, the movement of the armrest 4 in either the forward direction or the rearward direction does not complicate the controller moving mechanism D of the controller positioning structure S.

The controller moving mechanism D of the controller positioning structure S that moves the armrest 4 in either the forward direction or the rearward direction is preferably provided within the center console 3 beneath the armrest 4. The controller moving mechanism D preferably includes a console bracket 6, a pair of side brackets 7, a pair of guide rails 8, a pair of bridging plates 9, a spiral or threaded shaft 10, a driven gear 11, a motor 12, a drive gear 13, a slider 14, a nut portion 15, two sets of rollers 16 and a pair of foundation brackets 17.

The console bracket 6 is fixedly mounted in the center console 3. The console bracket 6 has a vertical front wall 6a, a rearwardly tilted rear wall 6b and a bottom wall 6c extending between the vertical front wall 6a and the rearwardly tilted rear wall 6b. The console bracket 6 has the side brackets 7 fixedly coupled to the left and right sides of the bottom wall 6c of the console bracket 6. The side brackets 7 are preferably mirror images of each other with their upper peripheral edges being slanted upward toward the front end of the center console 3.

The guide rails 8 are mounted on the opposed inner sides of the side brackets 7. The guide rails 8 are slanted upward toward the front end of the center console 3 such that the armrest 4 is positioned higher when at a forward position than when the armrest 4 is positioned at a rearward position relative to the front to rear direction of the vehicle. The guide rails 8 are provided in areas near the upper peripheral edges of the inner sides of the side brackets 7.

The bridging plates 9 are coupled between the side brackets 7. Specifically, one of the bridging plates 9 is coupled between the upper ends of the front edges of the side brackets 7, while the other bridging plate 9 is coupled between the upper ends of the rear edges of the side brackets 7.

The bridging plates 9 rotatably support the ends of the spiral shaft 10. The spiral shaft 10 is tilted to the same degree as the guide rails 8. The driven gear 11 is fixed to the rear end of the spiral shaft 10. The teeth of the driven gear 11 engage the teeth of the drive gear 13 of the motor 12 that is fixed to the rear wall 6b. Therefore, the spiral shaft 10 is rotatable in both rotational directions due to the driving force of the motor 12.

The nut portion 15 is threadedly coupled to the spiral shaft 10. The nut portion 15 is disposed at substantially the center of the slider 14. The foundation brackets 17, which are fixed to a bottom surface of the armrest 4, are installed at the left and right ends of the slider 14. Each set of the rollers 16 includes four rollers 16 provided on the left and right sides of the slider 14. Two rollers of each set of the rollers 16 are arranged to engage the bottom surfaces of the guide rails 8, while the rollers of each set of the rollers 16 are arranged to engage the top surfaces of the guide rails 8. Thus, the slider 14 is slidably supported on the guide rails 8 to move in the front and rear direction of the vehicle. More specifically, the slider 14 move in the front and rear direction of the vehicle on the guide rails 8 by the spiral shaft 10 and the nut portion 15 being driven by the motor 12. Therefore, by rotating the spiral shaft 10 with the motor 12, the slider 14 and the armrest 4 moves in either the forward direction or the rearward direction along the tilted guide rails 8. Since the motor 12 has a brake mechanism installed therein, the armrest 4 can be fixed at any position where the motor 12 stops. In other words, the armrest 4 and the controller 5 are arranged and configured to be position at an infinite number of positions within the front and rear movable range of the guide rails 8.

This motor 12 for the armrest 4 and the controller 5 is connected with an electrically powered motor $M_1$ that moves the driver's seat 1 in either the forward direction or the rearward direction. Thus, when the driver's seat 1 moves forward, the armrest 4 and the controller 5 also moves forward. However, the armrest 4 and the controller 5 has a smaller movable range in the front to rear direction than the front to rear movable range of the driver's seat 1. Thus, the armrest 4 and the controller 5 move in proportion to the movement of the driver's seat 1, instead of the same distance as the driver's seat 1. In other words, when the driver's seat 1 is at the most forward position or the most rearward position within its front to rear movable range, the armrest 4 and the controller 5 are also at the most forward position or the most rearward position within its front to rear movable range. The most forward position and the most rearward position of the armrest 4 and the controller 5 are determined based on two limit switches R. When the driver's seat 1 moves, for instance, 30% within its front to rear movable range, the armrest 4 and the controller 5 also move 30% within their front to rear movable range. Accordingly, the relative position within the front to rear movable range is the same for both the driver's seat 1 and the armrest 4 and the controller 5.

In this manner, the armrest 4 and the controller 5 move in sync with the driver's seat 1. Therefore, by simply moving the driver's seat 1 in the front to rear direction, the position of the armrest 4 and the controller 5 can be automatically adjusted to the optimum front to rear position. Accordingly, the driver can operate the controller 5 easily in a natural posture.

Furthermore, in this embodiment, even when a small driver lifts with the lifter device L the sitting surface of the driver's seat 1 with the driver's seat 1 at its front position in order to maintain the driving eyesight (eye point) from a high position, the position of the armrest 4 and the controller 5 also becomes higher as the armrest 4 and the controller 5 move forward. Therefore, the position of the controller 5 can be adjusted to an optimum one not only in the front to rear direction, but also in the vertical direction. Accordingly, the operation of the controller 5 is further made easy. Additionally, if a small driver does not use the lifter device L when the driver's seat 1 is at the most forward position, the upper portion of the armrest 4 can be formed such that the portion on which the driver's elbow rests is shifted toward the navigator's seat 2. Therefore, the driver will be able to keep the comfortable posture, without having to feel tight.

In the above-described embodiment, the electronic control unit ECU is configured such that the armrest 4 moves in sync with the driver's seat 1 in the front to rear direction. However, the electronic control unit ECU is also configured such that the armrest 4 can be movable in the front to rear direction independently from the movement of the driver's seat 1. While the controller 5 has been illustrated and described as being attached to the armrest 4 so that the armrest 4 and the controller 5 move together, the controller moving mechanism D of the controller 5 can be attached directly to the controller 5, so that the controller 5 moves independently of the armrest 4 in the front to rear direction.

The electronic control unit ECU preferably includes a microcomputer with a control program that controls the motors $M_1$, $M_2$, and 12 as discussed above. The control program preferably includes memory settings for the positions of the driver's seat 1 and the armrest 4. In other words, the driver can set one or more preset positions for the positions of the driver's seat 1 and the armrest 4, so that the driver's seat 1 and the armrest 4 are automatically adjusted by pushing a single button to their preset positions. The electronic control unit ECU can also include other conventional components such as an input interface circuit, an output interface circuit, and storage devices such as a ROM (Read Only Memory) device and a RAM (Random Access Memory) device. The electronic control unit ECU is capable of selectively controlling any of the components of the control system in accordance with the control program. It will be apparent to those skilled in the art from this disclosure that the precise structure and algorithms for the electronic control unit ECU can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Second Embodiment

Referring now to FIGS. 6 and 7, an interior portion of a vehicle with a controller positioning structure S' is illustrated in accordance with a second embodiment. Basically, this embodiment is identical to the first embodiment discussed above, except that the pivoting lever or controller 5 has been replaced with a joystick or hand operated controller 5'. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a prime (').

As seen in FIGS. 6 and 7, the joystick or hand operated controller 5', is located at the front end portion of the armrest 4', between the driver's seat 1 and the navigator's seat 2. In other words, the armrest 4' and the controller 5' are provided above the center console 3, which is disposed between the driver's seat 1 and the navigator's seat 2. The controller moving mechanism D of the first embodiment moves the armrest 4' and the controller 5' in either the forward/upward direction or the rearward/downward direction in the same manner as the first embodiment discussed above.

The controller 5' is operatively coupled to the electronic control unit ECU, which in turn operates a controller operated mechanism O of the vehicle. As mentioned above, the controller operated mechanism O is at least one of a transmission mechanism, an acceleration mechanism, and a brake mechanism. In particular, movement of the controller 5' is detected by an electronic sensing device or controller sensor E that sends a vehicle control signal to the electronic control unit ECU, which in turn operates the controller operated mechanism O. Thus, the controller 5' is at least one of the following: a device that outputs shifting signals to the transmission mechanism; a device that outputs steering signals to the steering mechanism; a device that outputs acceleration signals to the acceleration mechanism; or a device that outputs braking signals to the brake mechanism.

As used herein, the following directional terms "forward, front, rearward, rear, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2001-102321. The entire disclosure of Japanese Patent Application No. 2001-102321 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A controller positioning structure for a vehicle, comprising:
    a controller configured to output a vehicle control signal; and
    a controller moving mechanism configured to be mounted adjacent a lateral side of a driver's seat of the vehicle, the controller moving mechanism being configured to selectively move in a front to rear direction of the vehicle in response to a movement of the driver's seat and to selectively stop at any desired position within a front to rear movable range, the controller moving mechanism being operatively coupled to the controller to move the controller in the front to rear direction of the vehicle.

2. The controller positioning structure as set forth in claim 1, wherein
    the controller is configured such that the vehicle control signal is at least one of a transmission signal for a transmission mechanism, a steering signal for a steering mechanism, an acceleration signal for an acceleration mechanism, and a braking signal for a brake mechanism.

3. The controller positioning structure as set forth in claim 2, wherein
the controller moving mechanism has an armrest coupled thereto and the controller is mounted to the armrest such that the controller and the armrest move together.

4. The controller positioning structure as set forth in claim 1, wherein
the controller moving mechanism has an armrest coupled thereto and the controller is mounted to the armrest such that the controller and the armrest move together.

5. The controller positioning structure as set forth in claim 4, wherein
the controller moving mechanism is configured to move the armrest substantially proportional to the front to rear movement of the driver's seat.

6. The controller positioning structure as set forth in claim 5, wherein
the controller is a lever that is arranged to be tilted in the front to rear direction of the vehicle.

7. The controller positioning structure as set forth in claim 5, wherein
the controller is a joystick that is arranged to be tilted in a forward direction, rearward direction, a leftward direction and a rightward direction relative to the vehicle.

8. The controller positioning structure as set forth in claim 1, wherein
the controller is a lever that is arranged to be tilted in the front to rear direction of the vehicle.

9. The controller positioning structure as set forth in claim 1, wherein
the controller is a joystick that is arranged to be tilted in a forward direction, rearward direction, a leftward direction and a rightward direction relative to the vehicle.

10. A controller positioning structure for a vehicle, comprising:
a controller configured to output a vehicle control signal; and
a controller moving mechanism configured to be mounted adjacent a lateral side of a driver's seat of the vehicle, the controller moving mechanism being configured to selectively move in a front to rear direction of the vehicle and to selectively stop at any desired position within a front to rear movable range, the controller moving mechanism being operatively coupled to the controller to move the controller in the front to rear direction of the vehicle,
the controller moving mechanism being configured to move such that the controller is positioned at a higher vertical position when the controller is stopped at a forward position within the front to rear movable range than when the controller is stopped at a rearward position within the front to rear movable range relative to the forward position.

11. The controller positioning structure as set forth in claim 10, wherein
the controller moving mechanism has an armrest coupled thereto and the controller is mounted to the armrest such that the controller and the armrest move together.

12. A controller positioning structure for a vehicle, comprising:
controller means for outputting a vehicle control signal; and
controller moving means for selectively moving the controller in a front to rear direction of the vehicle in response to a movement of a driver's seat and for selectively stopping the controller at any desired position within a front to rear movable range, the controller moving means being configured to be mounted adjacent a lateral side of the driver's seat of the vehicle.

13. A controller positioning structure for a vehicle, comprising:
a controller configured to output a vehicle control signal; and
a controller moving mechanism configured to be mounted adjacent a lateral side of a driver's seat of the vehicle, the controller moving mechanism being configured to selectively move in a front to rear direction of the vehicle and to selectively stop at any desired position within a front to rear movable range, the controller moving mechanism being operatively coupled to the controller to move the controller in the front to rear direction of the vehicle,
the controller being configured such that the vehicle control signal is at least one of a transmission signal for a transmission mechanism, a steering signal for a steering mechanism, an acceleration signal for an acceleration mechanism, and a braking signal for a brake mechanism,
the controller moving mechanism having an armrest coupled thereto and the controller is mounted to the armrest such that the controller and the armrest move together, and
the controller moving mechanism being configured to move such that the controller is positioned at a higher vertical position when the controller is stopped at a forward position within the front to rear movable range than when the controller is stopped at a rearward position within the front to rear movable range relative to the forward position.

* * * * *